United States Patent Office 2,828,273
Patented Mar. 25, 1958

2,828,273

PERFLUOROHALOCARBOXYLIC ACID ESTER MODIFIED SOLID POLYMER OF A FLUORINE-CONTAINING OLEFIN

Lester E. Robb, Westfield, N. J., assignor, by mesne assignments, to Minnesota Mining and Manufacturing Company, St. Paul, Minn., a corporation of Delaware No Drawing. Application June 29, 1955
Serial No. 518,939

15 Claims. (Cl. 260—31.2)

This invention relates to a novel polymeric composition and to a process for the preparation thereof. In one aspect, this invention relates to a novel normally solid fluorine-containing polymer having improved properties. In another aspect this invention relates to a process for modifying a normally solid fluorine-containing polymer. In a more particular aspect, this invention relates to a novel polymeric composition comprising a high molecular weight polymer of trifluorochloroethylene which compoition has improved properties, and to a method for the preparation thereof.

High molecular weight polymers including both resinous thermoplastics and elastomers are widely used in numerous industrial applications where their unusual chemical and physical properties are used to best advantage. Among the most outstanding of the properties of high molecular weight polymers and particularly the fluorine-containing polymers such as those of trifluorochloroethylene, is chemical inertness. Thus, such polymers may be exposed to a wide variety of oxidizing, reducing and solvent type reagents such as fuming nitric acid with no apparent effect on the polymers. In addition to their high degree of chemical stability, these polymers possess high thermal stability, excellent electrical properties and can be molded into various useful items.

In many applications in which industrial users employ high molecular weight polymers such as those of trifluorochloroethylene, it is often desirable that the properties of the polymer be somewhat modified. For example, the techniques presently employed for molding polytrifluorochloroethylene thermoplastic require the use of high temperatures ranging between about 415° F. and about 625° F., which temperatures are often necessary in order to cause the polymer to flow readily. Such temperatures, however, may also cause undesirable degradation of the polymer. In the case of elastomeric polymers such as copolymers of trifluorochloroethylene and vinylidene fluoride containing between about 30 and 50 mol percent of combined trifluorochloroethylene, it is often desirable to modify the properties of such polymers in order to obtain improvement in their low temperature flexibility.

One method commonly used to modify the properties of such high polymers is to admix the high polymer with a plasticizer. Many of the plasticizers presently employed, however, are relatively volatile and have a tendency to bleed during fabrication of the polymer, are deleteriously effected at the temperatures employed to mold the polymer and may tend to lower the degree of chemical inertness and heat stability of the polymer.

It is an object of the present invention to provide a novel solid polymeric composition having improved properties.

Another object is to provide a high polymer having improved properties, which properties will be retained under relatively extreme temperature conditions.

Another object is to provide a novel fluorine-containing plastic or elastomeric polymer composition, the properties of which are modified by a non-volatile compound which will not volatilize or bleed during fabrication of the polymer.

Another object is to provide a high molecular weight fluorine-containing polymeric composition which may be molded at a temperature at which degradation of the polymer is at a minimum.

A further object is to provide a novel thermoplastic composition of trifluorochloroethylene having improved flow properties and which can be molded at a temperature at which degradation of the polymer is at a minimum.

A further object is to provide a novel elastomeric composition of trifluorochloroethylene having improved low temperature properties.

A further object is to provide an efficient and novel process for modifying the properties of high molecular weight polymers.

A still further object is to provide a novel process for treating a normally solid polymer of trifluorochloroethylene to modify the polymer and from which the modifier will not bleed or volatilize during fabrication of the polymer.

Various other objects and advantages of the present invention will become apparent to those skilled in the art from the following description and disclosure.

According to the present invention a, normally solid polymer is admixed with an ester of a perfluorohalocarboxylic acid to produce a modified normally solid polymer of improved properties. This treatment of the solid polymer is preferably accomplished by admixing the ester with the polymer suspended in a liquid medium in finely divided form, the particle size of the suspended polymer being less than about 100 microns. The polymer which is modified to best advantage in accordance with the present invention is a normally solid fluorine-containing polymer having a high molecular weight, that is, a molecular weight above about 50,000 and is preferably a high molecular weight polymer of a fluorochloroolefin containing at least two fluorine atoms such as trifluorochloroethylene, including both resinous thermoplastics and elastomers. The esters which are used as the modifying agent include mono- and polyesters of perfluorochlorocarboxylic acids and perfluorocarboxylic acids, the esters having between about 7 and about 40 carbon atoms per molecule.

The modified polymer produced in accordance with the present invention has improved flow properties being moldable at a temperature below the temperature required for molding of the untreated polymer and/or improved low temperature flexibility, which improved properties are obtained without deleterious effect on the chemical inertness and heat stability of the polymer.

It has been found that the properties of the polymer are modified by as little as 0.01 weight percent of the ester (or a weight ratio of ester to polymer of about 0.0001:1) and that the weight ratio of the modifier to polymer may vary over relatively wide limits to obtain varying degrees of modification of the polymer. Generally, however, the weight ratio of modifier to polymer which is employed ranges between about 0.05:1 and about 2:1 and is preferably between about 0.1:1 and about 1:1.

Admixture of the solid polymer and the ester of the perfluorohalocarboxylic acid may be accomplished in a variety of ways. For example, admixture of the polymer and modifier may be accomplished in the dry state and in the wet state. Particularly good results are obtained by addition of the modifier to the polymer suspended in an organic liquid or water in finely divided form, the particle size of the suspended polymer preferably being less than about 10 microns and preferably having colloidal dimensions of the order less than about 0.1 micron in order to obtain more intimate contact between the ester modifier and polymer.

The treatment of the solid polymer and the ester is accomplished over a relatively wide range of temperatures such as between about 0° C. and about 150° C. and, in general, a temperature within the range between about 10° C. and about 50° C. is employed. The process of the present invention may be carried out at atmospheric pressure or under superimposed pressures up to 1000 pounds per square inch gage.

As above-stated esters of perfluorohalocarboxylic acids are employed as the modifiers of the present invention and may contain between about 7 and about 40 carbon atoms per molecule. The ester group of the modifier may be an alkyl, alkenyl and aryl radical and includes the substituted and unsubstituted radicals having between about 1 and about 20 carbon atoms per radical. The acids from which the esters are prepared may be perfluorochloro and perfluoro mono- and di-acids, and are preferably those acids having between about 6 and about 20 carbon atoms per molecule and in which at least one-half of the total number of the halogen substituents are fluorine atoms.

The perfluoro and perfluorochloro acids, the ester derivatives of which are used in accordance with the present invention, are obtained by a variety of procedures, such as the oxidation of a perhalogenated olefin which is at least half fluorinated and which is the product of thermal cracking of high molecular weight homopolymers or copolymers of perfluoro and/or perfluorochloro-olefins. The oxidation of the perhalogenated olefin is preferably carried out in the presence of potassium permanganate at a temperature below 80° C. and preferably at a subzero temperature such as —10° C. The perfluorohalo acids may also be produced by hydrolyzing with fuming sulfuric acid, the telomer product obtained by telomerizing an olefin which is at least half fluorinated such as trifluorochloroethylene in the presence of a perhalogenated methane or a sulfuryl halide. The hydrolysis of such a telomer product in fuming sulfuric acid is carried out at a temperature between about 140° C. and about 300° C. Other ester derivatives of carboxylic acids which may be employed as the modifier of the present invention include the ester derivatives of the polyfluoro and polyfluorochloro acids disclosed in U. S. Patent Nos. 2,559,752 and 2,559,629 respectively.

The esters are produced by a variety of procedures one of which is the direct esterification of a perfluorohalocarboxylic acid or perfluorohaloacid chloride with an alcohol or phenol in the presence or absence of a catalyst. Another method for the preparation of these compounds is the alcohol exchange reaction in which the perfluorohalocarboxylic acid is reacted with an ester of another acid, for example, acetic acid or any other acid having a boiling point lower than that of the perfluorohalo acid. Other methods include acid exchange and the ester exchange reactions.

The compounds which may be reacted with the perfluorohalo acids to produce the esters used in accordance with the present invention contain at least one hydroxy group and include substituted and unsubstituted phenols, aromatic alcohols and saturated and unsaturated aliphatic alcohols containing between about 1 and about 20 carbon atoms per molecule. Such hydroxy-containing compounds may be substituted, for example, with halogen and nitrogen. Typical examples of suitable phenols which may be employed are methyl phenol, ethyl phenol, isomeric cresols, ortho-hydroxychlorostyrene, alpha and beta-naphthols, and dimethyl amino phenol. Suitable aromatic alcohols which may be employed are cinnamyl, benzyl and alkyl phenoxy ethanols. Suitable saturated aliphatic alcohols including both monohydroxy and polyhydroxy alcohols, which may be employed are those of the homologous series methyl, ethyl, propyl ... eicosyl alcohols, dichlorohydrin, 2-dimethylamino ethanol, ethylene glycol, pentamethylene glycol, glycerol, erythritol, heptitol, chloral hydrate, triethanolamine, cyclohexanol, and glycidol. Illustrative of the unsaturated aliphatic alcohols are allyl, crotyl and tiglyl alcohols, chloroallyl and bromocrotyl alcohols, fluorohexenol, cyclopentenol, cyclohexenol, hexenol, pentenol and octynediol.

The preparation of the ester modifiers of the present invention is carried out by reaction of the free acid or acid chloride with the hydroxy-containing compound at a temperature between about 0° C. and about 250° C., and preferably at a temperature between about 10° C. and about 100° C. The esters begin to form as soon as the hydroxy compound is mixed with the acid or acid chloride, and the reaction is run to completion for a time which may be between two minutes and 96 hours. Generally speaking, the esterification reaction using the higher molecular weight alcohols require the longer reaction times. When the esters are prepared by reaction of the hydroxy compound and the free perfluorohalocarboxylic acid, it is desirable in most cases to remove water in order to produce greater yields of the ester.

The ester modifiers which are particularly effective in modifying the properties of a high molecular weight polymer containing at least 2 fluorine atoms for every chlorine atom are the ester derivatives of perfluorochlorocarboxylic acids containing at least 2 fluorine atoms for every chlorine atom. Such esters are the preferred modifiers for improving the properties of normally solid polymers of fluorine-containing olefins containing at least 2 fluorine atoms for every chlorine atom inasmuch as they are similar in structure to and are essentially completely compatible with such fluorochlorocarbons. Typical examples of these preferred esters are those having the general formulas:

(1)
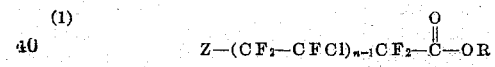

and (2)
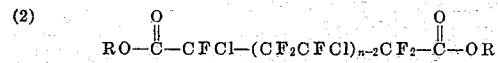

wherein Z is selected from the group consisting of chlorine and perhalomethyl radicals having a total atomic weight not in excess of 146.5, $n$ is an integer from 2 to 10, and R is selected from the group consisting of substituted and unsubstituted alkyl, alkenyl and aryl radicals having not in excess of about 20 carbon atoms. Such esters are prepared as above-described by treating the above-mentioned hydroxy compounds with the hydrolysis products of telomers produced by telomerizing trifluorochloroethylene with a bromohalomethane such as, for example, bromotrichloromethane or with a sulfuryl halide such as, for example, sulfuryl chloride. These telomers are respectively represented by the following general formulas:

(3) 
(4) 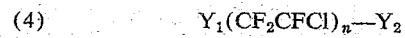

wherein M is a perhalomethyl radical having a total atomic weight not higher than 146.5, $n$ is an integer from 2 to 10, $Y_1$ is a halogen selected from the group consisting of fluorine, chlorine and bromine, and $Y_2$ is a halogen selected from the group consisting of fluorine and chlorine. Oftentimes the hydrolysis products of such telomers represent mixtures of acids, which mixtures are esterified to produce mixtures of esters. Such mixtures may also be employed to advantage as the modifier without departing from the scope of the present invention.

Typical examples of the preferred ester modifiers employed by the process of the present invention are those listed in the following Table I.

TABLE I

*Physical properties of esters of perfluorochlorocarboxylic acids*

| Ester | Boiling point °C. | Boiling point mm. Hg | Index of Refraction, $n_D^{20}$ | Density $d_4^{20}$ |
|---|---|---|---|---|
| (1) methyl 3,5,6-trichlorooctafluorohexanoate Cl(CF$_2$CFCl)$_2$CF$_2$COOCH$_3$ | 87 | 10.0 | 1.3834 | 1.74 |
| (2) methyl 3,5,7,8-tetrachloroundecafluorooctanoate Cl(CF$_2$CFCl)$_3$CF$_2$COOCH$_3$ | 131.5–133 | 760.0 | 1.3952 | 1.826 |
| (3) butyl 3,5,7,8-tetrachloroundecafluorooctanoate | 105–107 | 0.45 | 1.4001 | 1.635 |
| (4) octyl 3,5,7,8-tetrachloroundecafluorooctanoate | 155 | 0.1 | 1.4104 | 1.41 |
| (5) octadecyl 3,5,7,8-tetrachloroundecafluorooctanoate | 200 | 0.1 | 1.4279 | 1.290 |
| (6) pentaerythritol monoester of 3,5,7,8-tetrachloroundecafluorooctanoic acid | | | 1.4217 | |
| (7) dipropyl 3,5,7-trichlorononafluorosuberate C$_3$H$_7$OOC–(CF$_2$CFCl)$_3$–COOC$_3$H$_7$ | 118–122 | 0.6 | 1.3952 | 1.49 |
| (8) dioctyl 3,5,7-trichlorononafluorosuberate | 180 | 0.07 | 1.420 | 1.265 |
| (9) allyl 3,5,6-trichlorooctafluorohexanoate | 101.5 | 10.0 | 1.3960 | 1.62 |
| (10) allyl 3,5,7,8-tetrachloroundecafluorooctanoate | 160 | 1.0 | 1.4026 | 1.704 |
| (11) diallyl 3,5,7-trichlorononafluorosuberate | 160 | 6.0 | 1.4068 | 1.546 |
| (12) diester of pentamethylene glycol and 3,5,7,8-tetrachloroundecafluorooctanoic acid | | | 1.4118 | 1.750 |

Other typical examples of the preferred ester modifiers are propyl, octyl, octadecyl, vinyl, and allyl 3,5,6-trichlorooctafluorohexanoate; propyl, vinyl and phenyl 3,5,7,8-tetrachloroundecafluorooctanoate; dimethyl, dibutyl, dioctadecyl, divinyl and diallyl 3,5-dichlorohexafluoroadipate; and dimethyl, dibutyl and divinyl 3,5,7-trichloroperfluorosuberate.

Other types of preferred esters are the tetraesters obtained by the reaction between a polyhydroxy alcohol and a mono- and diperfluorochlorocarboxylic acid. For example, reaction between pentamethylene glycol and 3,5,7,8-tetrachloroundecafluorooctanoic acid and 3,5,7-trichlorononafluorosuberate leads to the production of the tetraester having the formula:

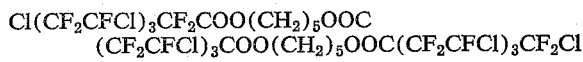

an index of refraction ($n_D^{21.5}$) of 1.4157 and a density ($d_4^{20}$) of 1.734.

Typical examples of suitable esters of perfluorocarboxylic acids which may be employed are diethyl perfluorosebacate, diethyl perfluoroadipate, diisopropyl perfluoroadipate, and diallyl perfluoroadipate.

The polymers which are modified to best advantage by the process of the present invention are the normally solid high molecular weight resinous thermoplastic and elastomeric polymers obtained by polymerization of a fluorine-containing olefin, which olefin is preferably one containing at least two fluorine atoms per molecule and not in excess of about 10 carbon atoms per molecule. The polymers which are markedly improved by the modifiers of the present invention and especially by the esters of the perfluorochlorocarboxylic acids are polymers of a fluorochloroolefin which is preferably a perfluorochloroolefin having not more than about 5 carbon atoms per molecule. Typical examples of such polymers are the homopolymers of fluoromonoolefins such as vinylidene fluoride, tetrafluoroethylene, trifluorochloroethylene, bromotrifluoroethylene; homopolymers of fluorine-containing dienes such as 1,1-difluorobutadiene, 1,1,2-trifluorobutadiene, 1,1,3-trifluorobutadiene, 1,1-difluoro-3-methyl butadiene and 2-trifluoromethyl butadiene; homopolymers of fluorine-containing alpha-methylene carboxylic acids and derivatives such as alpha-trifluoromethyl acrylonitrile and methyl-alpha-trifluoromethacrylate; and the homopolymers of fluorinated styrenes such as phenyl trifluoroethylene.

Copolymers which may be modified by the process of the present invention include those obtained from any of the above-mentioned fluorine-containing monomers as well as from trifluoroethylene, dichlorodifluoroethylene, 3,3,3-trifluoropropene, perfluoropropene and perfluoroisobutene, and a polymerizable unsaturated olefin. The polymerizable unsaturated olefin comonomer is preferably an olefin having not in excess of about 10 carbon atoms per molecule and includes substituted and unsubstituted ethylenically mono- and diunsaturated hydrocarbons, derivatives of alpha-methylene carboxylic acids, vinyl ethers and alkyl acrylates. Typical examples of such copolymers are those of trifluorochloroethylene and vinylidene fluoride, which copolymers may be either thermoplastic or elastomeric, trifluorochloroethylene and tetrafluoroethylene, trifluorochloroethylene and vinyl fluoride, trifluorochloroethylene and vinyl chloride, trifluorochloroethylene and vinylidene chloride, trifluorochloroethylene and hexafluoropropene, trifluorochloroethylene and trifluoroethylene, tetrafluoroethylene and 1,1-chlorofluoroethylene, vinylidene fluoride and 1,1-chlorofluoroethylene, perfluoropropene and vinylidene fluoride, tetrafluoroethylene and butadiene, trifluorochloroethylene and n-butyl acrylate, trifluorochloroethylene and 1,1,2,2-tetrafluoroethyl vinyl ether, and trifluorochloroethylene and 1,1-difluorobutadiene.

It has been found that when the resinous thermoplastic polymers of a fluorochloroolefin in which at least half of the total number of halogen substituents are fluorine atoms, are modified with the esters of perfluorochlorocarboxylic acids in which the only hydrogen atoms are those in the ester group, the flow properties of such polymers are greatly improved without any loss of the desirable properties of the untreated polymer such as chemical inertness and heat stability. Particularly good results are obtained when high molecular weight polytrifluorochlorethylene thermoplastic and the copolymer of trifluorochloroethylene and vinylidene fluoride containing above about 69 and preferably less than about 80 mol percent of combined trifluorochloroethylene, are modified with the ester of the perfluorochloro acids such as methyl 3,5,7,8-tetrachloroperfluorooctanoate and dioctyl 3,5-dichloroperfluoroadipate. Such modified compositions are moldable at a temperature below that which is ordinarily required to mold the untreated polymer, and degradation of the modified polymer is at a minimum during the molding operation.

It has also been found that the modifiers of the present invention and preferably the esters of perfluorochlorocarboxylic acids such as dipropyl 3,5,7-trichloroperfluorosuberate, improve the low temperature flexibility of the elastomeric polymers such as the trifluorochloroethylene-vinylidene fluoride copolymer containing between about 30 and about 50 mol percent of combined trifluorochloroethylene.

The esters of the perfluorocarboxylic acids, on the other hand, have their greatest effect on improving the properties of polymers in which fluorine is the sole halogen substituent such as high molecular weight polytetrafluoroethylene homopolymer.

It has been found that in some instances and especially when the polymer is suspended in an aqueous medium, it is particularly beneficial to have a peroxy promoter present when the polymer and modifier are admixed. Modification of the polymer in the presence of a peroxy promoter is particularly preferred and effective when an unsaturated ester is used as the modifier. Such promoters comprise the inorganic and organic peroxides which are preferably water soluble peroxides. Examples of suitable inorganic peroxides are the water-soluble peroxides such as the perborates, persulfates, perphosphates, percarbonates, barium peroxide, zinc peroxide and hydrogen peroxide. Particularly valuable are the water-soluble salts of the peracids such as the sodium, potassium, calcium, barium and ammonium salts of the persulfuric and perphosphoric acids. Examples of suitable organic peroxides comprise the water-soluble peroxides such as diacetyl peroxide, trichloroacetyl peroxide, perfluoropionyl peroxide, dichlorofluoroacetyl peroxide, 3,4-dibromobutyryl peroxide, 3-carboxypropionyl peroxide and the like. When such promoters are employed, they are admixed with the modifier and polymer in a weight ratio of promoter to polymer of between about 0.001:1 and about 0.2:1, and preferably in a weight ratio of between about 0.01:1 and about 0.1:1.

As above-stated, admixture of the normally solid polymer and the ester modifier may be accomplished in a variety of ways. Regardless of the technique employed the above-mentioned peroxy promoters may be admixed with the other ingredients. One technique involves admixture of the polymer and modifier in the dry state in finely divided form, that is in the form of a powder preferably of sufficient fineness to pass through a 40 mesh screen or finer. Convenient tumbling-type mixers such as a barrel mixer and conical mixer may be employed. If the polymer and modifier are not in a sufficiently divided form then they may be ground in a suitable grinding type mixer such as a micropulverizer. Admixture may also be effected by a wet blending technique employing a suitable liquid medium. When using a wet blending technique admixture is effected by placing the ingredients in the desired proportions in an apparatus suitable for wet blending such as a ball mill. Mixtures of naphtha, toluene and aliphatic ketones such as acetone and methyl ethyl ketone, may be employed as the medium in which wet blending is carried out.

In order to obtain the maximum intimate contact between the modifier and polymer and extremely homogeneous blends of ingredients, the modifier is preferably added to a suspension or dispersion of the polymer in a liquid medium. This procedure is particularly preferred when using a peroxy promoter and an unsaturated ester modifier. Such a technique leads to markedly improved modification of the polymers, and volatilization or bleeding of the modifier from the polymer during its fabrication has been found to be negligible when such a technique is employed. Typical dispersions of polymers which may be treated in accordance with the process of the present invention are those disclosed in U. S. Patent Nos. 2,686,738, 2,686,767 and 2,686,770.

In one modification of this invention the modifier may also be added directly to the aqueous suspension or dispersion of polymer as it is obtained from the polymerization zone. Such dispersions of polymers such as those of trifluorochloroethylene are obtained by conducting the polymerization in an aqueous suspension type catalyst system in which a water soluble peroxy promoter is employed with or without the addition of an activator, accelerator or emulsifier. The peroxy promoters which may be used comprise any of the inorganic water soluble peroxy compounds mentioned hereinabove and are preferably employed in a concentration between about 0.01 and about 2 percent by weight based on water. The activators which are often used in conjunction with the promoter comprise sodium bisulfite, sodium meta-bisulfite, sodium thiosulfate, trimethylamine, and, in general, any water soluble reducing agent. Equimolar amounts of the promoter and activator are preferred. The accelerators comprise water soluble variable valence metal salts of sulfates, nitrates, phosphates and chlorides such as cuprous sulfate, ferrous sulfate and silver nitrate.

The emulsifiers which may be employed in the preparation of the polymers which are modified by the process of the present invention comprise metal salts such as the potassium or sodium salt derivatives derived from saturated aliphatic acids, the optimum chain length of the acid being between about 14 and about 20 carbon atoms, and the metal salts of perfluorochlorocarboxylic and polyfluorocarboxylic acids. The preferred emulsifiers are the metal salts of the acids obtained upon hydrolysis of the trifluorochloroethylene sulfuryl chloride telomers in sulfuric acid and contain an even number of carbon atoms. The emulsifier is generally present in a quantity between about 0.5 and about 10 parts by weight per 100 parts of total monomer or monomers.

Buffering agents may also be employed to obtain appropriate pH conditions during the polymerization reaction. Such buffering agents comprise disodium hydrogen phosphate and sodium meta-borate.

The polymerizations are conducted at a temperature between about 0° C. and about 75° C. and preferably at a temperature between about 5° C. and about 30° C. for a reaction time ranging between about 10 and about 35 hours. The polymerization may be conducted in a batchwise manner under autogenous conditions of pressure by charging the total quantity of monomer at the start of the reaction. The polymerization may also be conducted in a continuous manner by introducing the monomer into the reaction zone continuously while withdrawing polymer product continuously at a constant temperature and pressure.

A typical examples of one type of aqueous polymerization recipe which may be employed to prepare the aqueous dispersions of polymers modified by the process of the present invention is the following aqueous emulsion system:

| | Parts by weight |
|---|---|
| Water | 300 |
| Total monomer or monomers | 100 |
| Potassium persulfate | 2.5 |
| Potassium 3,5,7,8-tetrachloroundecafluorooctanoate | 4.5 |
| Buffer | 3.6 |

In some instances it may be desirable to add a compound to the dispersion of polymer before it is treated with the modifier, which compound will prevent coagulation of the dispersion. This may be accomplished by the addition of the metal salts of perfluorohaloalkanoic acids which are preferably the salts of the acids from which the ester modifier is derived. When the process of the present invention is carried out with the addition of such dispersion stabilizing compounds, they are added to the dispersion in an amount ranging between about 0.01 and about 2 weight percent based on 100 parts of polymer, but generally not more than about 1 weight percent is required. When the dispersion of said polymer which is treated with the ester modifier is used as it is prepared in the polymerization zone and when the polymerization is conducted in an aqueous suspension catalyst system in which a metal salt of a perfluorohaloalkanoic acid is used as the emulsifier, there is often a sufficient quantity of such salt in the dispersion to prevent coagulation of the dispersion so that additional amounts do not have to be added.

The admixture of the dispersion of polymer and ester modifier is accomplished with moderate agitation. The mixture thus obtained may be applied directly as such to a surface such as a metal or fabric surface by conventional spraying or dipping techniques to obtain more flexible and improved protective coatings. Alternatively, the dispersion of the modified polymer may be allowed to settle or the more stable dispersions may be coagulated by conventional techniques such as by freezing in a solid carbon dioxide-acetone bath.

The modified polymeric compositions of the present invention in the form of dry molding powder may be molded by using suitable molding equipment at a temperature between about 200° F. and about 450° F. and at a pressure between about 500 and about 25,000 pounds per square inch. The molding is accomplished with negligible thermal degradation of the polymer and with a minimum amount of bleeding of the added ester of the perfluorohalocarboxylic acid from the polymer.

When the product of the present invention is modified in the absence of a peroxy promoter, the product is an extremely homogeneous blend of the polymer and modifier which may or may not be cross-linked to some extent. However, when a peroxy promoter is employed, there is indication that a reaction takes place between the polymer and ester modifier producing a cross-linked polymer in which the ester modifier is chemically bonded to the polymer. The cross-linking which is promoted by the presence of a peroxy compound is particularly apparent when an unsaturated ester such as diallyl 3,5,7-trichlorononafluorosuberate is employed as the ester modifier. When it is desired to obtain a modified polymer having the improved properties brought about by cross-linking, it is preferred to have a peroxy compound present during the treatment of the polymer with the ester. When the aqueous dispersions of the polymers which are treated in accordance with the present invention are prepared in a polymerization catalyst system comprising a water soluble peroxy promoter such as potassium persulfate, oftentimes there is a sufficient amount of the peroxy compound to promote cross-linking of the modifier and polymer and thus additional quantities of the promoter do not have to be added. The above cause for the improved results obtained by the present method and composition is merely theoretical and other theories or reasons may equally well explain the invention and may ultimately be found to be the true cause.

The following examples are offered as a better understanding of the present invention and are not to be construed as unnecessarily limiting thereto.

EXAMPLE 1

This example illustrates the modification of normally solid high molecular weight polytrifluorochloroethylene with a saturated ester derivative of a perfluorochlorocarboxylic acid.

(A) The high molecular weight polytrifluorochloroethylene employed in this example was prepared in an aqueous emulsion catalyst system in which potassium persulfate was used as the promoter and in which potassium 3,5,7,8-tetrachloroundecafluorooctanoate was used as the dispersing reagent. The polymerization was conducted at a temperature of 22° C. for a period of 22 hours at a pressure of 120 pounds per square inch gage, the pH of the system being maintained at a value of 8.5 by the use of disodium hydrogen phosphate as a buffer.

(B) To a glass stoppered flask 50 ml. of an aqueous dispersion of high molecular weight polytrifluorochloroethylene thermoplastic having an N. S. T. value of 300, and 2.0 grams of dipropyl 3,5,7-trichlorooctafluorosuberate were charged. There were approximately 6.0 grams of dispersed polymer in the aqueous dispersion or about 12 percent solids content. The stoppered flask was moderately shaken in a shaking machine at 20° C. for a period of 48 hours. At the end of this time, the reaction mixture was coagulated by freezing in a solid carbon dioxide-acetone bath. The coagulated product was collected, washed with hot water and dried in vacuo at 35° C. to yield 7.8 grams of modified high molecular weight polytrifluorochloroethylene homopolymer.

(C) A blank run in which 30 ml. of an aqueous dispersion of polytrifluorochloroethylene having an N. S. T. value of 300 was shaken at 20° C. for a period of 68 hours without the addition of any modifier, otherwise the conditions of admixing were the same as those employed in part B of this example.

(D) A 2.0 gram sample of the modified polymer of polytrifluorochloroethylene prepared by the procedure of part B of this example was submitted to compression molding which involved preheating the sample at 400° F. for four minutes followed by pressing for two minutes at 400° F. under 20,000 pounds per square inch pressure. The diameter of the pressed sheet was measured as an indication of the relative flow character as compared to the unmodified sheet of polytrifluorochloroethylene and was found to be 3.7 inches. A clear, transparent, continuous and tough plastic sheet was obtained with essentially no volatilization or "bleeding" of the ester during the molding operation at 400° F.

A 2.0 gram sample of the unmodified high molecular weight polytrifluorochloroethylene thermoplastic of part C of this example was similarly pressed except that a temperature of 500° F. was required to obtain a suitable flow of polymer for the molding operation. The diameter of the pressed sheet was 3.5 inches at 500° F. Essentially no flow of the unmodified polymer was observed at 400° F.

EXAMPLE 2

This example illustrates the effect of esters of perfluorochlorocarboxylic acids on the properties of a high molecular weight fluorine-containing elastomer.

(A) The elastomer which was modified by the procedure of this example contains 49 mole percent of combined trifluorochloroethylene and 51 mole percent of combined vinylidene fluoride, and was prepared by the following polymerization reaction:

A two gallon autoclave was charged with 51,650 grams of water, 1.6 grams of potassium persulfate, 3.2 grams of sodium metabisulfite and 8.4 grams of ferrous sulfate heptahydrate. Thereafter the autoclave was charged with 8500 grams of trifluorochloroethylene and 8720 grams of vinylidene fluoride. The polymerization reaction was conducted under autogenous conditions of pressure at a temperature of 5° C. for a period of 20 hours after which period unreacted monomers were removed by flash distillation. The polymer latex was coagulated by freezing. The coagulated product was collected, washed with hot water, and dried yielding an elastomer which upon analysis was found to contain 49 mole percent of combined trifluorochloroethylene and 51 mole percent of combined vinylidene fluoride.

(B) A series of runs, that is, run numbers 2 to 5 of Table II below, was made in which 100 grams of the raw elastomeric copolymer stock prepared by the procedure of part A of this example, were banded on a 2 roll rubber mill. In each run the raw copolymer was heated to a temperature of about 45° C., follower by the slow addition of 20 grams of the ester modifier indicated in the following Table II. The ester modifier was added to the rubber with constant cutting and turning of the stock on the mill. In each instance the ester modifier mixed readily with the trifluorochloroethylene-vinylidene fluoride copolymer and essentially no bleeding of the modifier was observed. In each run a softer, more flexible product was obtained having improved low temperature flexibility. The specific ester modifiers employed and the Gehman stiffness data obtained in each case are given in the following Table II. The Gehman stiffness values, namely, $T_2$ and $T_5$ represent the temperature (° C.) at which the polymer is twice ($T_2$) and five times ($T_5$) as stiff as it is at 25° C.

Run number 1 of Table II represents a blank run in which 100 grams of the 49:51 trifluorochloroethylene: vinylidene fluoride copolymer were treated under the same operating conditions as above described except that no ester modifier was admixed with it. A comparison of the $T_2$ and $T_5$ values of the unmodified polymer of run number 1 with the corresponding values obtained for the modified polymer, clearly demonstrates the marked effect which the esters of perfluorochlorocarboxylic acids have on improving the low temperature flexibility of the high molecular weight fluorine-containing elastomer employed.

TABLE II

*Modification of trifluorochloroethylene-vinylidene fluoride elastomeric copolymer [1] using esters of perfluorochlorocarboxylic acids as the modifier*

| Run | Ester | $T_2$(° C.) | $T_3$(° C.) |
|---|---|---|---|
| (1) | none | +5 | 0 |
| (2) | dioctyl 3,5,7-trichlorononafluorosuberate | −19 | −19 |
| (3) | octyl 3,5,7,8-tetrachloroundecafluorooctanoate | −20 | −21 |
| (4) | methyl 3,5,6-trichlorooctafluorohexanoate | −17 | −19 |
| (5) | butyl 3,5,7,8-tetrachloroundecafluorooctanoate | −18 | −19 |

[1] The copolymer employed contained 49 mole percent of combined trifluorochloroethylene and 51 mole percent of combined vinylidene fluoride.

As is apparent the present invention relates to novel normally solid polymeric compositions having improved properties, which improved properties are brough about by incorporation of an ester of a perfluorohalocarboxylic acid into the polymer. The properties of polymers of fluorochloroolefins having at least 2 fluorine atoms are particularly improved by admixture with an ester of a perfluorochloroacid which ester modified does not have any deleterious effect on the desirable properties of the polymer. Various alterations and modifications of the specific amounts of ingredients and treating conditions may become apparent to those skilled in the art without departing from the scope of this invention.

I claim:

1. The novel composition of matter which comprises a mixture of a solid polymer of a fluorine-containing olefin having not more than 10 carbon atoms per molecule and a saturated organic ester of a perfluorohalocarboxylic acid having not more than two carboxyl groups, the weight ratio of said ester to said polymer being between about 0.0001:1 and about 2:1.

2. The novel composition of matter which comprises a mixture of a solid polymer of a fluorochloroolefin containing at least 2 fluorine atoms and not more than 10 carbon atoms per molecule and a saturated organic ester of a perfluorochlorocarboxylic acid having not more than two carboxyl groups and between about 7 and about 40 carbon atoms per molecule and at least 2 fluorine atoms for every chlorine atom, the weight ratio of said ester to said polymer being between about 0.0001:1 and about 2:1.

3. The novel composition of matter which comprises a mixture of a solid thermoplastic homopolymer of trifluorochloroethylene and a saturated organic ester of a perfluorochlorocarboxylic acid having not more than two carboxyl groups, the weight ratio of said ester to said polymer being between about 0.0001:1 and about 2:1.

4. The novel composition of matter which comprises a solid elastomeric copolymer of trifluorochloroethylene and vinylidene fluoride containing between about 30 and about 50 mol percent of combined trifluorochloroethylene and a saturated organic ester of a perfluorochlorocarboxylic acid having not more than two carboxyl groups, the weight ratio of said ester to said polymer being between about 0.0001:1 and about 2:1.

5. The novel composition of matter which comprises a mixture of a solid polymer of a fluorine-containing olefin having not more than 10 carbon atoms per molecule and methyl 3,5,6-trichlorooctafluorohexanoate, the weight ratio of said ester to said polymer being between about 0.05:1 and about 2:1.

6. The novel composition of matter which comprises a mixture of a solid polymer of a fluorine-containing olefin having not more than 10 carbon atoms per molecule and butyl 3,5,7,8-tetrachloroundecafluorooctanoate, the weight ratio of said ester to said polymer being between about 0.05:1 and about 2:1.

7. The novel composition of matter which comprises a mixture of a solid polymer of a fluorine-containing olefin having not more than 10 carbon atoms per molecule and octyl 3,5,7,8-tetrachloroundecafluorooctanoate, the weight ratio of said ester to said polymer being between about 0.05:1 and about 2:1.

8. The novel composition of matter which comprises a mixture of a solid polymer of a fluorine-containing olefin having not more than 10 carbon atoms per molecule and dipropyl 3,5,7 - trichlorononafluorosuberate, the weight ratio of said ester to said polymer being between about 0.05:1 and about 2:1.

9. The novel composition of matter which comprises a mixture of a solid polymer of a fluorine-containing olefin having not more than 10 carbon atoms per molecule and dioctyl 3,5,7-trichlorononafluorosuberate, the weight ratio of said ester to said polymer being between about 0.05:1 and about 2:1.

10. The novel composition of matter which comprises a mixture of a solid polymer of trifluorochloroethylene and a saturated organic ester of a perfluorohalocarboxylic acid having not more than two carboxyl groups, the weight ratio of said ester to said polymer being between about 0.0001:1 and about 2:1.

11. The novel composition of matter which comprises a mixture of a solid thermoplastic homopolymer of trifluorochloroethylene and dipropyl 3,5,7 - trichloroperfluorosuberate, the weight ratio of said ester to said homopolymer being between about 0.1:1 and about 1:1.

12. The novel composition of matter which comprises a solid elastomeric copolymer of trifluorochloroethylene and vinylidene fluoride containing between about 30 and about 50 mol percent of combined trifluorochloroethylene and butyl 3,5,7,8 - tetrachloroperfluorooctanoate, the weight ratio of said ester to said copolymer being between about 0.1:1 and about 1:1.

13. The novel composition of matter which comprises a solid elastomeric copolymer of trifluorochloroethylene and vinylidene fluoride containing between about 30 and about 50 mol percent of combined trifluorochloroethylene and octyl 3,5,7,8-tetrachloroperfluorooctanoate, the weight ratio of said ester to said copolymer being between about 0.1:1 and about 1:1.

14. The novel composition of matter which comprises a solid elastomeric copolymer of trifluorochloroethylene and vinylidene fluoride containing between about 30 and about 50 mol percent of combined trifluorochloroethylene and methyl 3,5,6-trichloroperfluorohexanoate, the weight ratio of said ester to said copolymer being between about 0.1:1 and about 1:1.

15. The novel composition of matter which comprises a solid elastomeric copolymer of trifluorochloroethylene and vinylidene fluoride containing between about 30 and about 50 mol percent of combined trifluorochloroethylene and dioctyl 3,5,7-trichloroperfluorosuberate, the weight ratio of said ester to said copolymer being between about 0.1:1 and about 1:1.

No references cited.